US012361730B2

(12) United States Patent
Frey

(10) Patent No.: US 12,361,730 B2
(45) Date of Patent: Jul. 15, 2025

(54) METHOD AND ARRANGEMENT FOR THE DIGITAL CAPTURE OF SPACES IN A BUILDING

(71) Applicant: Siemens Schweiz AG, Zürich (CH)

(72) Inventor: Christian Frey, Unterägeri (CH)

(73) Assignee: SIEMENS SCHWEIZ AG, Zurich (CH)

( * ) Notice: Subject to any disclaimer, the term of this patent is extended or adjusted under 35 U.S.C. 154(b) by 473 days.

(21) Appl. No.: 17/919,390

(22) PCT Filed: Apr. 9, 2021

(86) PCT No.: PCT/EP2021/059318
§ 371 (c)(1),
(2) Date: Oct. 17, 2022

(87) PCT Pub. No.: WO2021/209341
PCT Pub. Date: Oct. 21, 2021

(65) Prior Publication Data
US 2023/0154214 A1  May 18, 2023

(30) Foreign Application Priority Data
Apr. 17, 2020 (DE) .................. 10 2020 204 921.1

(51) Int. Cl.
*G06V 20/60* (2022.01)
*G06F 17/40* (2006.01)
(Continued)

(52) U.S. Cl.
CPC .......... *G06V 20/64* (2022.01); *G06V 10/7715* (2022.01); *G06V 10/95* (2022.01); *G10L 15/22* (2013.01)

(58) Field of Classification Search
USPC ................. 382/103, 151–224; 704/1–275; 706/1–62, 900–903
See application file for complete search history.

(56) References Cited

U.S. PATENT DOCUMENTS

| 10,762,251 B2* | 9/2020 | Santarone ............ G06T 19/006 |
| 2016/0328660 A1* | 11/2016 | Huang ................. G07G 1/0045 |

(Continued)

FOREIGN PATENT DOCUMENTS

| DE | 10 2017 208 174 | 11/2018 | ............. G01C 21/04 |
| EP | 3 534 240 | 9/2019 | ............... G06F 3/01 |
| EP | 3 586 553 | 6/2021 | ............... G01S 5/14 |

OTHER PUBLICATIONS

Search Report for International Application No. PCT/EP2021/059318, 14 pages, Jul. 26, 2021.
(Continued)

*Primary Examiner* — Marcellus J Augustin
(74) *Attorney, Agent, or Firm* — Slayden Grubert Beard PLLC

(57) ABSTRACT

Various embodiments of the teachings herein include a method for the digital capture of spaces of a building. In some embodiments, the method includes: scanning a corresponding space in the building by a scanning apparatus; capturing the corresponding space in a digital point cloud and/or by an image capture; performing an object recognition, based on the digital point cloud and/or the image capture, using means of artificial intelligence; mapping, after the object recognition is performed, the digital point cloud and/or the image capture in a digital building model; and in the case of the capture of defined objects in the building, capturing the respective defined object in a dedicated manner by the scanning apparatus. Attributes are allocated to the respective defined object by a voice input.

14 Claims, 3 Drawing Sheets

(51) Int. Cl.
    *G06F 18/00*     (2023.01)
    *G06V 10/77*     (2022.01)
    *G06V 10/82*     (2022.01)
    *G06V 10/94*     (2022.01)
    *G06V 20/64*     (2022.01)
    *G06V 20/70*     (2022.01)
    *G10L 15/22*     (2006.01)
    *G10L 17/22*     (2013.01)

(56) References Cited

U.S. PATENT DOCUMENTS

2018/0328737 A1* 11/2018 Frey .................. H04W 4/33
2020/0117903 A1* 4/2020 Goel .................. G06V 20/35

OTHER PUBLICATIONS

Maheswari, Uma N et al: "Speaker independent speech recognition system based on phoneme identification"; International Conference on Computing; Communication and Networking; IEEE; pp. 1-6; XP031442622.

\* cited by examiner

METHOD AND ARRANGEMENT FOR THE DIGITAL CAPTURE OF SPACES IN A BUILDING

CROSS-REFERENCE TO RELATED APPLICATIONS

This application is a U.S. National Stage Application of International Application No. PCT/EP2021/059318 filed Apr. 9, 2021, which designates the United States of America, and claims priority to DE Application No. 10 2020 204 921.1 filed Apr. 17, 2020, the contents of which are hereby incorporated by reference in their entirety.

TECHNICAL FIELD

The present disclosure relates to building maps and management. Various embodiments of the teachings herein include methods and/or arrangements for the digital capture of spaces of a building, wherein a corresponding space in the building is scanned by a scanning apparatus and said space is captured in a digital point cloud and/or an image capture.

BACKGROUND

More and more engineering offices and architects use a digital building model (BIM, building information model, digital twin). A digital building model renders possible in particular a comprehensive exchange of information between the parties involved (stakeholder) in the construction and in the operation (in other words the management) of a building. The components and elements of a building in this case are typically mapped in an IFC notation (industry foundation classes) in the digital building model.

In order to digitally capture the spaces/area of a building, predominantly scanning equipment or scanning apparatuses (for example NavVis scanner or scanning apparatuses from the company NavVis) are used which generate a point cloud with reference to the reflections of for example walls, doors, windows, machines, furniture etc. and create an orientation plan and even a floor plan therefrom. The scanners usually operate on the basis of lasers, infrared or acoustic sensor technology. The scanning equipment can be used in a static or also mobile manner. In the latter case, the scanning equipment can then be moved through the building in a portable or drivable manner.

A so-called indoor viewer (presentation device or software tool for presenting digitally captured spaces) increases the meaning of the 3D laser scanning in that said indoor viewer makes the scan data visible and usable for all parties in the building. An indoor viewer can be used as a collaborative platform for the display and the exchange of building information or can be integrated into existing software platforms in order to render possible a new dimension of spatial understanding. Users can explore scanned spaces as if on site in that said users move in a highly detailed realistic digital twin and also change floors.

Point clouds are in general limited to specialists who work with floor plans and digital building models (BIM models; BIM stands for building information model). An indoor viewer combines point clouds with highly detailed vivid 360° images to form a digital twin and it is possible using said digital twin for each interested building viewer to precisely explore the scanned spaces and to interact with said scanned spaces as they would do in real life.

An indoor viewer typically comprises a content management system that is easy to operate and scalable so as to add geo-tagged information (in other words location information is allocated to an item of information) and media to 3D scans. Users can click with the right mouse button on an arbitrary position on the screen in order to add and to display this information as an object of interest or as a point of interest (POI). A corresponding search function in the indoor viewer facilitates a user in finding the desired information in the 2D plan or in the 3D scan.

It has hitherto been merely complex using manual visual identification to find and annotate objects that are captured digitally by scanning equipment. It is therefore particularly time-consuming and susceptible to error since objects that are digitally captured can be easily overlooked in the point cloud or in a 3D scan.

SUMMARY

The teachings of the present disclosure provide methods and/or arrangements for effectively locating and annotating objects that are digitally captured by scanning equipment. For example, some embodiments include a method for the digital capture of spaces (R1, R2) of a building, (VS1) wherein a corresponding space (R1, R2) in the building is scanned by a scanning apparatus (MG1-MG3) and is captured in a digital point cloud (PW1-PW3) and/or by an image capture, (VS2) wherein, based on the digital point cloud (PW1-PW3) and/or the image capture, an object recognition is performed using means of artificial intelligence, (VS3) wherein after the object recognition is performed the digital point cloud (PW1-PW3) and/or the image capture is mapped in a digital building model (BIM), characterized in that (VS4) in the case of the capture of defined objects (OB1, OB2) in the building, the respective defined object (OB1, OB2) is captured in a dedicated manner by the scanning apparatus (MG1-MG3) and wherein attributes (A) are allocated to the respective defined object (OB1, OB2) by a voice input (SPRE).

In some embodiments, the voice input (SPRE) is performed at the scanning location of the respective defined object (OB1, OB2) in the building.

In some embodiments, the voice input (SPRE) is performed at the scanning location of the respective defined object (OB1, OB2) by a user, wherein the respective attributes for a defined object (OB1, OB2) are provided to a user (P1, P2) on an output apparatus.

In some embodiments, the respective attributes (A) for a defined object (OB1, OB2) are provided on the output apparatus in dependence upon the location of the scanning apparatus (MG1-MG3).

In some embodiments, for the object recognition of defined objects (OB1, OB2) the attributes (A) that are allocated to the respective defined object (OB1, OB2) by the voice input (SPRE) are used.

In some embodiments, for the recognition of the voice input (SPRE) a voice recognition that is not dependent upon the speaker is used.

In some embodiments, in the case of the recognition of a nearby defined object (OB1, OB2), the scanning apparatus (MG1-MG3) outputs a notification for the user (P1, P2) of the scanning apparatus (MG1-MG3).

As another example, some embodiments include a scanning apparatus (MG1-MG3) for the implementation of a method as described herein.

As another example, some embodiments include an arrangement for the digital capture of spaces (R1, R2) of a building, the arrangement comprising: a scanning apparatus (MG1-MG3) for scanning and/or recording a space (R1, R2)

in the building, wherein the scanning apparatus (MG1-MG3) is configured so as to generate a digital point cloud (PW1-PW3) and/or a digital image capture based on the data that is obtained by the scanning and/or by the recording; a processing facility (S) that is configured so as to perform an object recognition using means of artificial intelligence based on the digital point cloud (PW1-PW3) and/or the digital image capture, wherein the processing facility (S) is further configured so as to map the digital point cloud (PW1-PW3) and/or the image capture in a digital building model (BIM); characterized in that the scanning apparatus (MG1-MG3) comprises a voice recognition apparatus (SPEV1-SPEV3) for capturing voice inputs with regard to defined objects (OB1, OB2) in the space (R1, R2), wherein attributes (A) are allocated by a voice input (SPRE) to a respective defined object (OB1, OB2) and said attributes are used in the generation of the point cloud (PW1-PW3) and/or the image capture.

In some embodiments, in the case of the capture of defined objects in the building, the respective defined object (OB1, OB2) is captured in a dedicated manner by the scanning apparatus (MG1-MG3), and wherein attributes (A) can be allocated in a dedicated manner to the respective defined object (OB1, OB2) by a voice input (SPRE).

In some embodiments, there is a position determining system (IPS) for recognizing the location of the scanning apparatus (MG1-MG3) in the building, wherein the respective attributes for a defined object (OB1, OB2) are provided on the output apparatus in dependence upon the location of the scanning apparatus (MG1-MG3).

In some embodiments, the voice input is performed at the location of the respective defined object (OB1, OB2) by a user (P1, P2), wherein the respective attributes (A) for a defined object (OB1, OB2) can be provided to the user (P1, P2) on an output apparatus.

In some embodiments, in the case of the recognition of a nearby defined object (OB1, OB2), the scanning apparatus (MG1, MG3) outputs a notification for the user (P1, P2) of the scanning apparatus (MG1-MG3).

In some embodiments, the processing facility (S) is integrated into the scanning apparatus (MG1-MG3).

In some embodiments, the processing facility (S) is integrated into a cloud infrastructure (C).

BRIEF DESCRIPTION OF THE DRAWINGS

Various embodiments of the teachings of the present disclosure are explained using the example of the following figure, in which.

DETAILED DESCRIPTION

Figure 1:
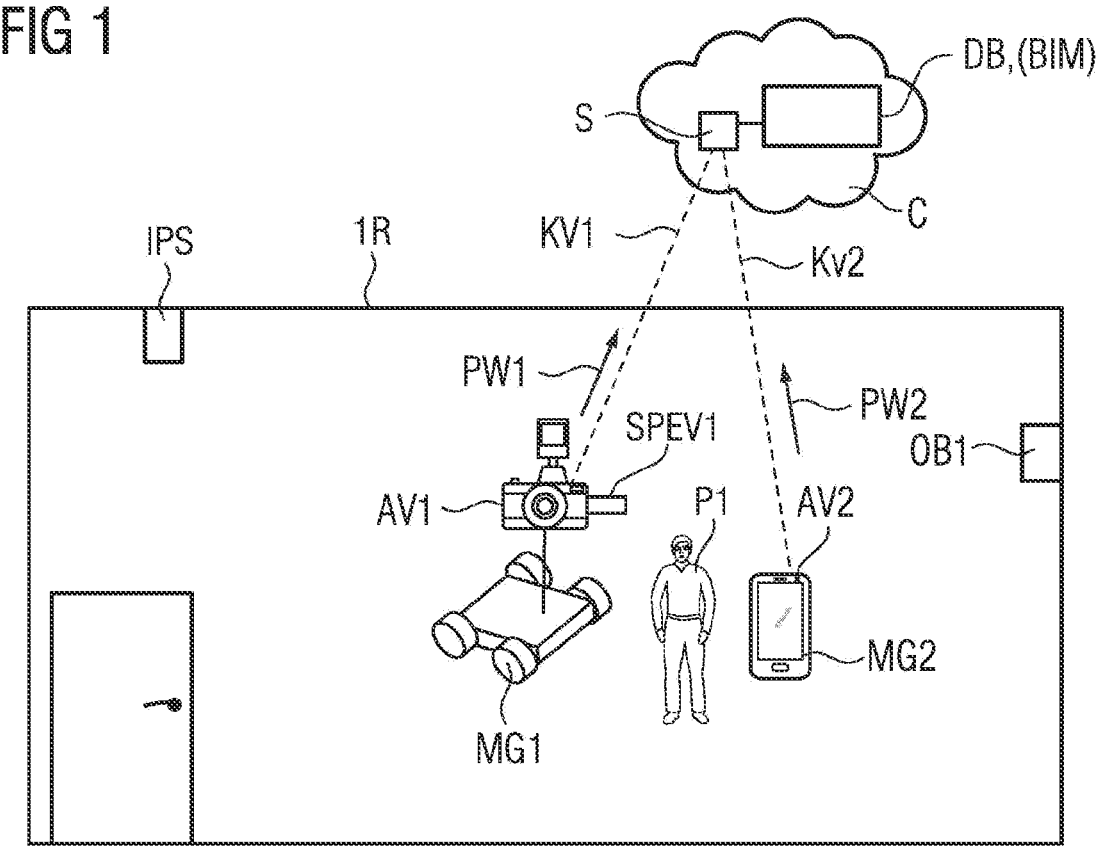
FIG. 1 shows a first exemplary arrangement for the digital capture of spaces of a building incorporating teachings of the present disclosure.

The teachings herein include methods for digitally capturing spaces (for example rooms, hallways) of a building, wherein a corresponding space in the building is scanned (measured) by a scanning apparatus (for example NavVis scanner) and is captured in a digital point cloud and/or by image capture (the image capture can be performed for example by a digital camera), wherein, based on the digital point cloud and/or the image capture, an object recognition is performed (advantageously also an object identification is performed) using means of artificial intelligence, wherein after the object recognition is performed the digital point cloud and/or the image capture is mapped in a digital building model, wherein in the case of the capture of defined objects (for example point of interest, POI, objects of interest) in the building the respective defined object (for example a fire detector, an actuator, or a sensor) is captured in a dedicated manner by the scanning apparatus (for example by a camera and/or point cloud) and wherein attributes (for example location information, building development information, type information, product information) are allocated to the respective defined object by a voice input of an operator of the scanning apparatus. Consequently, objects are enriched with additional meta information (for example tags, attributes) by audio input of an operator during the building scan.

In some embodiments, the annotation of the image content is performed by the scanning person by suitable voice recognition. In some embodiments, the voice recognition is a trained voice recognition based on mechanisms of machine learning. The dedicated capture of a defined or previously determined object (for example a fire detector, an actuator or a sensor) by the scanning apparatus can be performed for example by a capturing facility that is configured for this purpose (for example by zooming in on the object by a camera that is attached to the scanning apparatus). In some embodiments, the object recognition also comprises an object identification. The image capture can be performed for example in the form of a digital image capture by accordingly suitable digital cameras. This can be performed by individual capture (or a sequence of individual captures) and/or by capturing one or multiple video sequences. In some embodiments, the image capture comprises an image recognition for recognizing or identifying objects in the image capture. In some embodiments, algorithms of pattern recognition and/or pattern classification and/or pattern analysis are used for the image recognition. In some embodiments, methods of artificial intelligence are also used for the image recognition.

The verbal or linguistic annotation may be in particular advantageous in the capture or recording of round objects. In a digital image capture or in a point cloud, it is not easy for example to differentiate a fire detector from a motion detector. The object is provided with the corresponding attribute (fire detector or motion detector) by the verbal or linguistic annotation to the object. This information is filed in the digital building model (BIM) together with the object. Consequently, an explicit object recognition and advantageously in the case of a corresponding annotation also an object identification is ensured.

A defined object (for example point of interest, POI) is for example an object that is known beforehand in the space. For example, an inventory object that is located in the space. In some embodiments, the object that is known beforehand or the inventory object are stated in an inventory catalogue or an inventory plan for the space. The user has access to the inventory catalogue and/or the inventory plan. In some embodiments, the inventory catalogue and/or the inventory plan are displayed on a display of the scanning apparatus.

In some embodiments, the voice input is performed at the scanning location of the respective defined object in the building. As a consequence, the position of the scanning apparatus can automatically be used as an annotation for the defined object.

In some embodiments, the voice input is performed at the scanning location of the respective defined object by a user, wherein the respective attributes for a defined object are provided to a user on an output apparatus (for example display of a mobile communication end terminal or display on the scanning apparatus). As a consequence, a user can add the annotations to the corresponding object by reading aloud (at a suitable volume) the information from the display. In some embodiments, the information on the display will be by an alternative source (for example existing building plan (for example as a PDF document).

In some embodiments, the respective attributes for a defined object are provided on the output apparatus (for example display) in dependence upon the location of the scanning apparatus. As a consequence, the operator of the scanning apparatus does not have to search for the corresponding information with regard to an object in a pre-existing building plan since the information that is to be annotated is provided in dependence upon the position of the scanning apparatus. In some embodiments, an object that has been provided with annotations is acknowledged by the operator. As a consequence, it is ensured that an object is not overlooked.

In some embodiments, for the object recognition (and advantageously also for an object identification) of defined objects the attributes that are allocated to the respective defined object by the voice input are used. This renders it possible to increase the confidence of the object recognition also for the object identification. The confidence can be determined for example by the use of precision recall diagrams (PR diagrams).

In some embodiments, for the recognition of the voice input a voice recognition that is not dependent upon the speaker is used (Siri, etc.; optimization via deep learning). A voice recognition that is not dependent upon the speaker does not require a training phase beforehand.

In some embodiments, in the case of the recognition of a nearby defined object (for example from an old pre-existing plan or an alternative information source), the scanning apparatus outputs a notification (optically and/or acoustically) for the user of the scanning apparatus. It is therefore avoided that objects are forgotten or overlooked.

In some embodiments, there is a scanning apparatus (scanning equipment) for implementing the method in accordance with the invention. A pre-existing piece of scanning equipment or scanning apparatus can be easily upgraded in order to render possible the method in accordance with the invention.

In some embodiments, there is an arrangement for the digital capture of spaces (rooms, hallways) of a building, the arrangement comprising: a scanning apparatus (for example NavVis scanner) for scanning and/or recording a space (room, hallway) in the building, wherein the scanning apparatus is configured so as to generate a digital point cloud and/or a digital image capture based on the data that is obtained by the scanning and/or recording; a processing facility that is configured so as to perform an object recognition (advantageously also an object identification) using means of artificial intelligence based on the digital point cloud and/or the image capture, wherein the processing facility is further configured so as to map the digital point cloud and/or the image capture in a digital building model (BIM, building information model, digital twin); wherein the scanning apparatus comprises a voice recognition apparatus (for example microphone) for capturing voice input with regard to defined objects in the space, wherein attributes (for example location information, development information, manufacturer information, product information) are allocated by a voice input to a respective defined object and said attributes are used in the generation of the point cloud and/or the image capture. The point cloud and/or the digital image capture is filed in a suitable storage medium. The storage medium can be provided in the scanning apparatus itself. The storage medium can however also be implemented in a cloud infrastructure having a suitable data connection (for example radio connection, IP connection) to the scanning apparatus.

In some embodiments, a voice recognition that is not dependent upon the speaker is used. In some embodiments, the scanning also comprises a measurement of the space. The image capture can be performed for example in the form of a digital image capture by accordingly suitable digital cameras. This can be performed by individual capture (or a sequence of individual captures) and/or recording one or multiple video sequences. In some embodiments, the image capture comprises an image recognition for recognizing or identifying objects in the image capture. In some embodiments, algorithms of pattern recognition and/or pattern classification and/or pattern analysis are used for the image recognition. In some embodiments, methods of artificial intelligence are also used for the image recognition.

In some embodiments, in the case of the capture of defined objects in the building, the respective defined object is captured in a dedicated manner by the scanning apparatus (for example by camera), and wherein attributes can be allocated in a dedicated manner to the respective defined object by a voice input. The dedicated capture of a defined or a previously determined object (for example a fire detector, an actuator, or a sensor) by the scanning apparatus can be performed for example by a recording facility that is configured for this purpose (for example by zooming in on the object by a camera that is attached to the scanning apparatus).

In some embodiments, the arrangement comprises a position determining system (for example IPS, indoor GPS) for recognition of the location of the scanning apparatus in the building, wherein the respective attributes for a defined object can be provided on an output apparatus (for example display of a mobile communications end terminal or display on the scanning apparatus) in dependence upon the location of the scanning apparatus. As a consequence, the operator of the scanning apparatus does not need to search for the corresponding information with regard to the object in an already existing building plan since the information that is to be annotated is provided in dependence upon the position of the scanning apparatus. In some embodiments, an object that has been provided with annotations is acknowledged by the operator. As a consequence, it is ensured that an object is not overlooked.

In some embodiments, the voice input is performed at the location of the respective defined object by a user, wherein the respective attributes for a defined object can be provided to the user on an output apparatus (for example display of a mobile communications end terminal or display on the scanning apparatus). As a consequence, a user can add the annotations to the corresponding object by reading aloud (at a suitable volume) the information from the display. In some embodiments, the information on the display is by an alternative source (for example pre-existing building plan (for example as a PDF document)). Advantageously, the voice input is performed at the scanning location of the respective defined object by the user.

In some embodiments, in the case of the recognition of a nearby defined object, the scanning apparatus outputs a notification (optically and/or acoustically) for the user of the scanning apparatus. It is therefore avoided that objects are forgotten or overlooked.

In some embodiments, the processing facility is integrated into the scanning apparatus. The processing facility is a processor or computer that is configured for this purpose having corresponding input/output means, a storage device, and communications means.

In some embodiments, the processing facility is integrated into a cloud infrastructure. In this case, the scanning apparatus is connected using suitable communications means (for example radio, wireless local area network) to the processing facility (for example computer). In some embodiments, the scanning apparatus and the processing facility comprise suitable storage means (for example database, flash storage).

What are known as "points of interest" (POI) can be generated using an indoor viewer. Points of interest (POIs) are points that are defined in the 3D coordinate system of the indoor viewer instance and said points have additional information and comprise a WGS 84 coordinates (GPS) for determining the position. All the POIs have a type, a type group, and a position. The content of a POI description can extend from the simple text to embedded iFrames. The addition of user defined data to POIs is useful for the connection to applications that are based on the indoor viewer. The POIs are usually allocated objects in the 3D scan and said POIs can be retrospectively identified by hand by a person in the indoor viewer and can be allocated by means of an editor.

A further possibility is in the image recognition of the objects. The object recognition is a computer vision technology for identifying objects in images or videos. The object recognition is an important output of deep learning and machine learning algorithms. If humans view a photo or video, we can easily recognize humans, objects, scenes and visual details. The goal is to teach a computer to do that which is natural for humans: to achieve an understanding for what an image contains. 3D models, component identification, edge recognition and analysis of phenomena from various viewing angles are associated with the method for object identification.

The object recognition may be performed on the convergence points of robotics, machine vision, neural networks and AI (artificial intelligence).

Object Recognition by Deep Learning

Deep learning techniques have become a popular method for object recognition. Deep learning models such as convolutional neural network (CNNs) are used in order to automatically learn the inherent features of an object in order to identify this object. For example, a CNN can learn to recognize differences between cats and dogs in that said CNN analyses thousands of training images and learns the features that make cats and dogs different. There are two approaches in order to perform object recognition by means of deep learning:

Training a model from the ground up: In order to train a deep network from the ground up, you collect a particularly large, labelled data set and design a network architecture that learns the functions and creates the model. The results can be impressive however this approach requires a particularly large quantity of training data and it is necessary to configure the layers and weights in the CNN.

Using a pretrained deep learning model: Most deep learning applications use the transfer learning approach, a process that includes the fine tuning of a pre-trained model. You start with an existing network, such as for example AlexNet or GoogLeNet, and input new data having hitherto unknown classes. This method is less time-consuming and can lead to a more rapid result since the model has already been trained on thousands or millions of images.

Deep learning offers a high degree of accuracy, however requires a large quantity of data in order to make precise predictions. Deep learning for image-based localization Object Recognition by Machine Learning Machine learning techniques are also popular for object recognition and offer different approaches than deep learning. Common examples for machine learning techniques are:

HOG feature extraction having an SVM machine learning model

Bag-of-words models having functions such as SURF and MSER.

The Viola Jones Algorithm with which it is possible to recognize a plurality of objects, among them surfaces and upper bodies.

Workflow for Machine Learning

In order to perform the object recognition using a standard approach of machine learning, one starts with a collection of images (or videos) and you select the relevant functions in each image. In this manner for example, a feature extraction algorithm can extract edge features or corner features that can be used for the differentiation of classes in your data.

These functions are added to a machine learning model that divides these functions into their different categories and then uses this information in the analysis and classification of new objects. It is possible to use a plurality of machine learning algorithms and feature extraction methods, which offer many combinations, in order to create a precise object recognition model. The use of machine learning for object recognition offers the flexibility to select the best combination of features and classifiers for the learning. It can achieve precise results with minimal quantities of data. The selection of the best approach for object recognition depends upon your application and the problem that is to be solved. In many cases, machine learning can be an effective technique, particularly if it is known which features or characteristics of the image are best suited to differentiating classes of objects.

The most important consideration that is to be noted in the selection between machine learning and deep learning is whether a powerful GPU and many labelled training images are available. If the answer to this question is no, a machine learning is perhaps the best choice. Deep learning techniques function in general better with more images and a graphics processor helps to shorten the time that is required so as to train the model.

Object Recognition Using MATLAB

It is possible using only a few lines of MATLAB® code to create machine learning and deep learning models for object recognition without the need to be an expert. The use of MATLAB for object recognition renders it possible to be successful in a shorter period of time. MATLAB automates the provision of models on company systems, clusters, clouds and embedded devices.

FIG. 1 illustrates a first exemplary arrangement for the digital capture of spaces of a building or building section R1. The exemplary arrangement in accordance with FIG. 1 for the digital capture of spaces R1 (for example room, hallway)

of a building comprises: a mobile scanning apparatus MG1 (for example NavVis scanner) for scanning and/or recording (for example photo and/or video recording) of a space R1 in the building, wherein the scanning apparatus MG1 is configured so as to generate a digital point cloud PW1 and/or a digital mapping based on the data that is obtained by the scanning and/or the recording; a processing facility S that is configured so as to perform an object recognition using means of artificial intelligence based on the digital point cloud PW1 and/or the digital mapping, wherein the processing facility S is further configured so as to map the digital point cloud PW1 and/or the digital mapping in a digital building model BIM (BIM, building information model, digital twin); characterized in that the scanning apparatus MG1 comprises a voice recognition apparatus SPEV1 (for example microphone) for capturing voice inputs with regard to defined objects OB1 in the space R1, wherein attributes (for example location information, building development information, manufacturer information, product information) are allocated by a voice input to a respective defined object OB1 and said attributes are used in the generation of the point cloud PW1 and/or the digital mapping. The point cloud PW1 is for example a 3D point cloud. (Definition of a point cloud in Wikipedia "A point cloud or a point cluster is a quantity of points of a vector space that has an unorganized spatial structure ("cloud"). A point cloud is described by the points that are included and said points are captured in each case by their spatial coordinates. Point clouds having georeferencing include points in an earth-related coordinate system. With regard to the points it is possible to capture additional attributes, such as for example geometric normals, color values or measuring accuracy").

In some embodiments, the scanning apparatus MG1 comprises a suitable recording apparatus AV1 (for example camera, lidar (light detection and ranging), ladar (laser detection and ranging), laser scanning, etc.) for scanning the space R1. In some embodiments, the scanning also comprises a measurement of the space R1. In some embodiments, an object identification is also performed together with the object recognition or in addition to the object recognition.

A suitable file format or graphics format is used for the digital mapping, for example for raster graphics (for example .ami, .apx, .bpg) and/or vector graphics (for example .ai, .cgm, .dwg, .dwf). Graphics formats can be for example JPG; Exif, IPTC or XMP. In some embodiments, the graphics formats are accordingly compressed.

In some embodiments, a corresponding space in the building is scanned (measured) by the scanning apparatus MG1 (for example NavVis scanner) and is captured in a digital point cloud and/or by digital mapping and advantageously further processed (for example mapping in the BIM).

A defined object (for example point of interest, POI) is for example an object that is known beforehand in the space. For example, an inventory object that is located in the space (in other words the defined object is an inventory object of the space). In some embodiments, the object that is known beforehand or the inventory object are listed in an inventory catalogue or an inventory plan for the space. The user has access to the inventory catalogue and/or the inventory plan. In some embodiments, the inventory catalogue and/or the inventory plan are displayed on a display of the scanning apparatus.

The point cloud is filed in a suitable storage medium DB (for example data bank, flash storage). The storage medium can be provided in a data processing unit (for example processor, computer) of the scanning apparatus MG1 itself. The storage medium can however also be implemented in a cloud infrastructure C having a suitable data connection KV1 (for example radio connection, IP connection) to the scanning apparatus MG1. Advantageously, a voice recognition SPEV1 that is not dependent upon the speaker is used.

In some embodiments, the scanning apparatus can also be an accordingly configured mobile communications end terminal MG2 (for example smartphone). The mobile communications end terminal MG2 is fitted with a suitable recording apparatus AV2 (for example camera). The point cloud PW2 that is generated by the recording apparatus AV2 can be relayed via a suitable communications connection KV2 (for example radio connection, IP connection) from the scanning apparatus MG2 (for example smartphone, tablet computer) to the processing facility S (accordingly configured server) so as to map the digital point cloud PW2 into a digital building model BIM (BIM, building information model, digital twin).

In some embodiments, the server S and the BIM database DB are realized in a cloud infrastructure C.

In some embodiments, the scanning apparatus MG1 is a mobile drivable apparatus operated by a user P1. The scanning apparatus MG2 is an accordingly configured mobile, portable apparatus (for example a smartphone) that is operated by a user P1. The voice annotations for an object OB1 are provided by the operator P1 of the corresponding scanning apparatuses MG1, MG2 by another person. The scanning apparatus can also be an accordingly configured drone.

In some embodiments, in the case of capturing defined objects OB1 in the building R1, the respective defined object OB1 is captured in a dedicated manner by the scanning apparatus MG1, MG2. Dedicated attributes (for example type characteristics, building development characteristics, relationships to the building infrastructure) are allocated by a voice input SPEV1 by the operator P1 to the respective defined object OB1.

The arrangement as shown in FIG. 1 comprises a position determining system IPS (for example indoor positioning system; I-Beacons) for recognizing the location of the scanning apparatus MG1, MG2 in the building R1, wherein the respective attributes for a defined object OB1 are provided on an output apparatus (for example display of the scanning apparatus MG1, MG2) in dependence upon the location of the scanning apparatus MG1, MG2.

In some embodiments, the voice input is performed at the location of the respective defined object OB1 by a user P1, wherein the respective attributes for a defined object OB1 can be provided to the user P1 on an output apparatus of the scanning apparatus MG1, MG2. Consequently, inter alia it is ensured that all the known attributes are allocated to the object OB1. Advantageously, the attributes are provided by an alternative or further source.

In some embodiments, in the case of the recognition of a nearby defined object OB1 the scanning apparatus MG1, MG2 outputs a notification (optically and/or acoustically) for the user P1 of the scanning apparatus MG1, MG2. It is consequently ensured that an object (PoI) OB1 that is defined is not forgotten during the allocation of attributes.

In some embodiments, the processing facility is integrated into the scanning apparatus. For example as a processor in an embedded system. The processing facility S however can also be integrated into a cloud infrastructure C. The processing facility S can be integrated into a cloud infrastructure C for example as a BIM server with access to a BIM database DB. The point cloud PW1, PW2 that is generated by the scanning apparatus (scanning equipment) MG1, MG2 is transmitted via suitable communications connections KV1, KV2 from the scanning apparatus MG1, MG2 to the BIM server S. The communications connections KV1, KV2 are for example radio connections, wireless local area network (WLAN), IP network connection).

Figure 2:
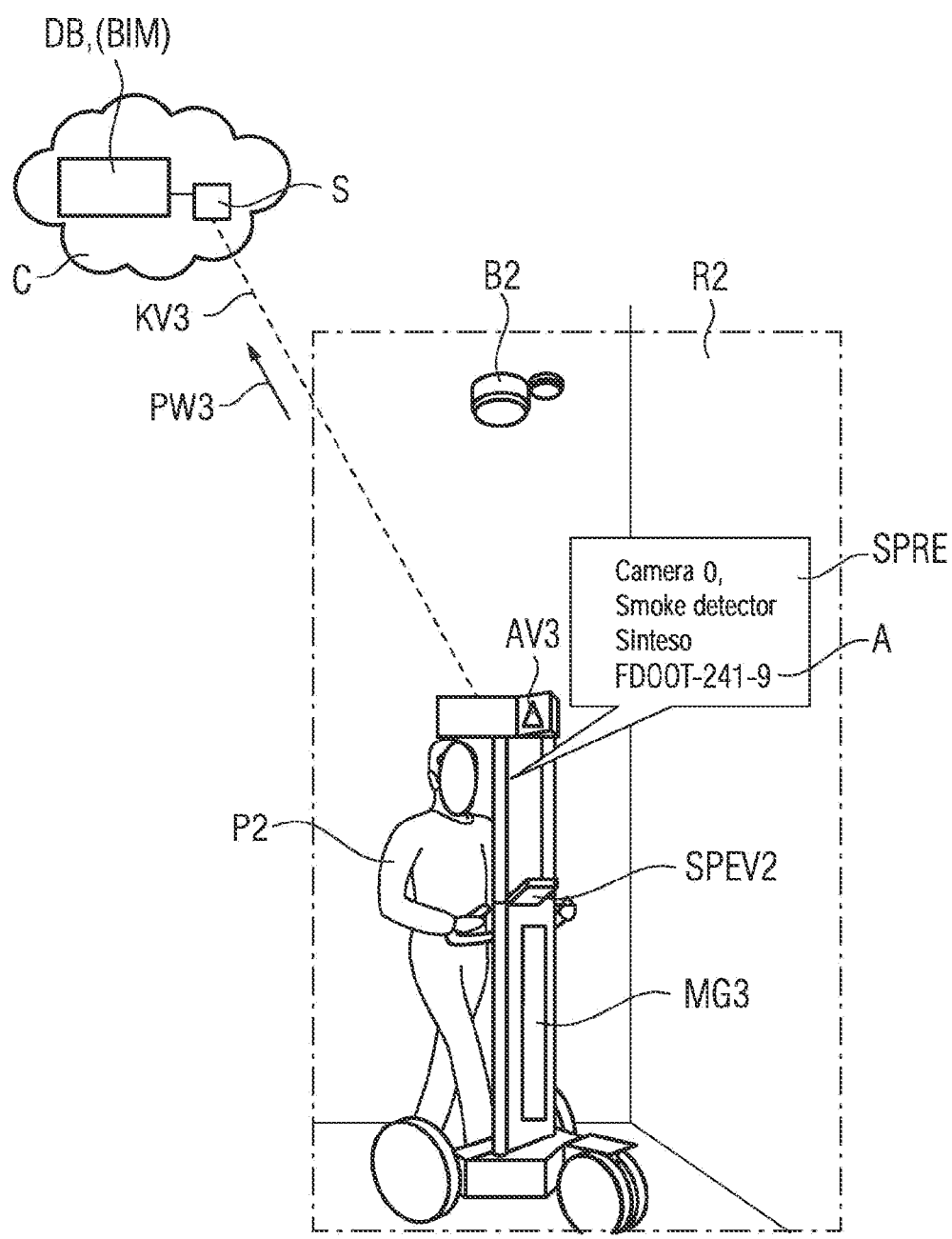
FIG. 2 shows a second exemplary arrangement for the digital capture of spaces of a building incorporating teachings of the present disclosure.

FIG. 2 illustrates a second exemplary arrangement for the digital capture of spaces of a building or building section R2. The exemplary arrangement in accordance with FIG. 2 for the digital capture of spaces R2 (for example room, hallway) of a building comprises: a mobile scanning apparatus MG3 (for example NavVis scanner) for scanning a space R2 in the building, wherein the scanning apparatus MG3 is configured so as to generate a digital point cloud PW3 based on the data that is obtained by the scanning; a processing facility S that is configured so as to perform an object recognition using means of artificial intelligence based on the digital point cloud PW3, wherein the processing facility S is further configured so as to map the digital point cloud PW3 in a digital building model BIM (BIM, building information model, digital twin); characterized in that the scanning apparatus MG3 comprises a voice recognition apparatus SPEV2 (for example microphone) for capturing voice inputs with regard to defined objects OB2 in the space R2, wherein attributes (for example location information, building development information, manufacturer information, product information) are allocated by a voice input SPRE to a respective defined object OB2 and said attributes are used in the generation of the point cloud PW3. The point cloud PW3 is for example a 3D point cloud. The point cloud PW3 is transmitted via a suitable communications connection KV3 (for example radio) from the scanning apparatus MG3 to the processing facility S. Advantageously, the transmission is performed in real time. The point cloud PW3 can however also be transmitted via the suitable communications connection KV3 (for example radio) from the scanning apparatus MG3 to the processing facility S by a batch run, for example triggered by the operator P2 or daily at a specific time. The processing facility S (for example BIM server) can be located in a cloud infrastructure C.

The scanning apparatus MG3 comprises a suitable recording apparatus AV3 (for example camera, lidar (light detection and ranging), ladar (laser detection and ranging), laser scanning etc.) for scanning the space R2. In some embodiments, the scanning also comprises a measurement of the space R2. In some embodiments, an object identification is also performed together with the object recognition or in addition to the object recognition.

In FIG. 2, the attributes A are allocated to the defined object OB2 (for example point of interest PoI) by the operator P2 by a voice input SPRE. In the exemplary illustration in FIG. 2, the defined object OB2 is a fire detector. The fire detector OB2 is captured in a dedicated manner by the recording apparatus AV3 of the scanning apparatus MG3 (for example by a camera that is located directly or approximately directly below the fire detector OB2). Advantageously, the camera AV3 is located in a perpendicular axis of the object OB2 with respect to the ground or in a range of 2 meters, in particular 1 meter, about the perpendicular axis in the case of a recording (or fixing) of the object OB2.

During the scan of the room R2 the operator P2 allocates the following exemplary attributes A to the object OB2 (fire detector) by a voice input SPRE: smoke detector, Sinteso, FDOOT241-9. The recording of the fire detector is to be performed by the exemplary camera 0. In the case of the generation of the point cloud, these attributes are allocated to the fire detector OB2 and also in the digital building model BIM these attributes are allocated to the object OB2. The attributes A are allocated to the object OB2 as additional meta information by the audio input or voice input when the building is scanned.

In some embodiments, for the recognition of the voice input SPRE a voice recognition that is not dependent upon the speaker is used (Siri, etc.; using optimization via deep learning and/or machine learning algorithms). A voice recognition that is not dependent upon the speaker does not require a training phase beforehand. The advantages or strengths of deep learning methods (for example neural networks) for example for voice recognition lie in the implicit learning of representations of the input data that lead to an optimal result (based on the quantity of the examples that are available). Compared to shallow methods, deep learning methods in general have a particularly high number of parameters (millions to billions) that must be optimized during the training process. Deep learning methods therefore require in general a considerably larger quantity of examples from which it is possible to learn and is particularly computing intensive with neural networks. Deep learning in effect has contributed much to a considerable number of application areas of machine learning, however, irrespective of its innovative power and clearly practical application possibilities, this type of machine learning is still associated with a considerable outlay.

In order to reduce this outlay and to simplify the object recognition and allocation at the early stage during the image capture and to severely limit the selection, the object that is to be identified (for example smoke detector) is described verbally via voice input at the early stage during the scan. The object that is recognized is approached and the description is performed via the voice input at the location: For example "camera 0, smoke detector Sinteso FDOOT241-9". "Camera 0" is in this case the upwardly-directed camera in the scanner. A microphone enable function (push to talk or voice activation) triggers the voice recording for the scan. Advantageously, the object that is to be recognized is approached as closely as possible with the possibility of a spacing in which the object can essentially be selectively recorded (advantageously alone in a recording). If the object that is to be recorded is located on the ceiling (such as for example is customary in the case of fire detectors) the recording is performed essentially in a perpendicular axis from below the object.

The object recognition can therefore "concentrate" on the object that is described by the voice recognition and allocates the description from the voice recognition to the object that is identified in the camera 0. A voice recognition that is not dependent upon the speaker is used in this case. Characteristic for the voice recognition "that is not dependent upon the speaker" is the characteristic that the user can start immediately with the voice recognition without a training phase beforehand. The vocabulary is, however, limited to a few thousand words. However, that is entirely sufficient for the objects in the building.

In the meantime, present day systems in the case of dictation of continuous texts on personal computers reach recognition quotas of approximately 99 percent and therefore meet the requirements for many application areas in practice, for example for scientific texts, business correspondence or legal documents. In addition to the size and flexibility of the dictionary, the quality of the acoustic recording also plays a crucial role. In the case of microphones that are directly attached in front of the mouth (for example in the case of headsets or telephones) a significantly higher recognition accuracy is achieved than in the case of room microphones that are further away. It is therefore advantageous to connect the trolley (scanner) to a headset.

The development of voice recognition is advancing particularly rapidly. Since 2016, voice recognition systems are used inter alia in smartphones. It is no longer necessary to train present day voice recognition systems. For a high degree of accuracy outside of everyday speech, in this case the plasticity of the system is crucial. In order to be able to meet high demands, professional systems offer the user the possibility of influencing the personal result by writing or speaking beforehand.

Since objects in buildings are usually installed according to functional guidelines and regulations, it is also possible to perform a filtered allocation of the object selection. For example, fire detectors are thus usually mounted in office buildings on the ceiling, in other words best recognized in camera 0. In the case of a light switch, for example in particular the region on the wall for example at a height of 1 m to 1.4 m adjacent to a passageway is analyzed and said region is best captured by the side cameras 1 or 3.

It is possible using georeferencing to additionally determine the WGS 84 coordinate (GPS) for position determining whereby the object can be annotated in the 2D/3D plan. It is additionally possible to place a corresponding symbol in a 2D plan. Furthermore, placement regulations can reduce the error rate or can provide notification of an incorrect placement. A fire detector must therefore for example be at a minimum distance from the room delimitation (wall, window).

Figure 3:
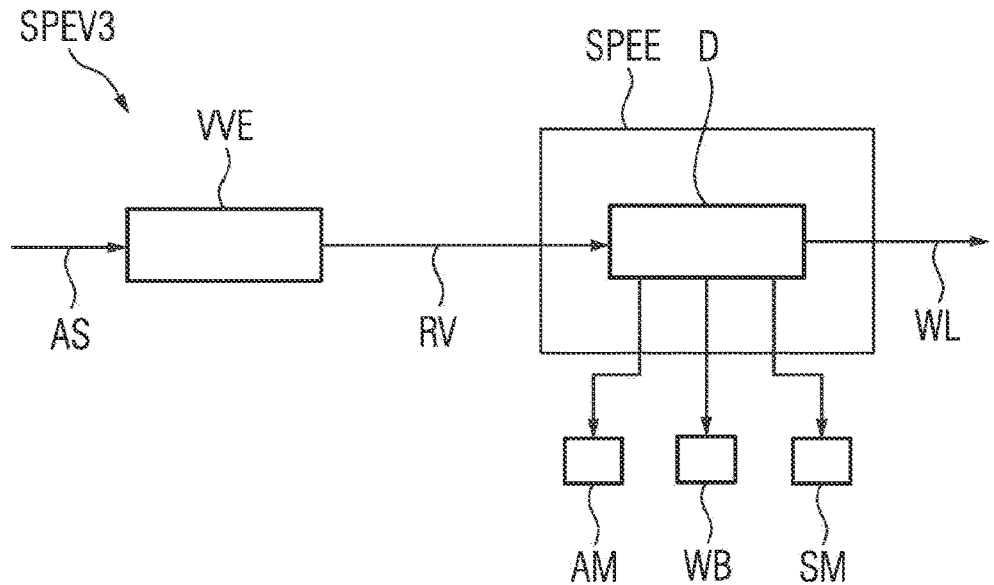
FIG. 3 shows an exemplary arrangement for a voice recognition apparatus incorporating teachings of the present disclosure.

FIG. 3 illustrates an exemplary arrangement for a voice recognition apparatus spev3 incorporating teachings of the present disclosure. Analogue voice AS of a user is captured by a pre-processing unit VVE and is transformed into corresponding reference vectors RV. The reference vectors RV are relayed to a decoder D of the voice recognition unit SPEE. Decoder D creates a "list of the words", in other words a word list WL, based on an acoustic model A M, a dictionary WB and a voice model SM.

Voice recognition is a method of voice analysis in which a computer-based system having automatic voice recognition analyses, classifies and stores the voice information that is input. The complex learning of interesting objects that are included in the scan (training data) can be reduced since the automatic voice recognition includes the exact description. The system can thus train and optimize itself in that said system includes software for the recognition and processing of naturally spoken voice.

Initially, many in particular new objects must certainly be trained in the cloud. However, this drastically reduces with the number of scans and the voice allocation since the objects that are to be captured and characterized are stored in a database (for example in the cloud) and the system therefore automatically broadens its training data and thus becomes better and better. In particular, it is advantageous that the scan generates a plurality of training data with regard to the same object that is allocated to the same voice pattern. This function is in particular then helpful if the object appears identical from the outside (housing) however differs in function.

Figure 4:
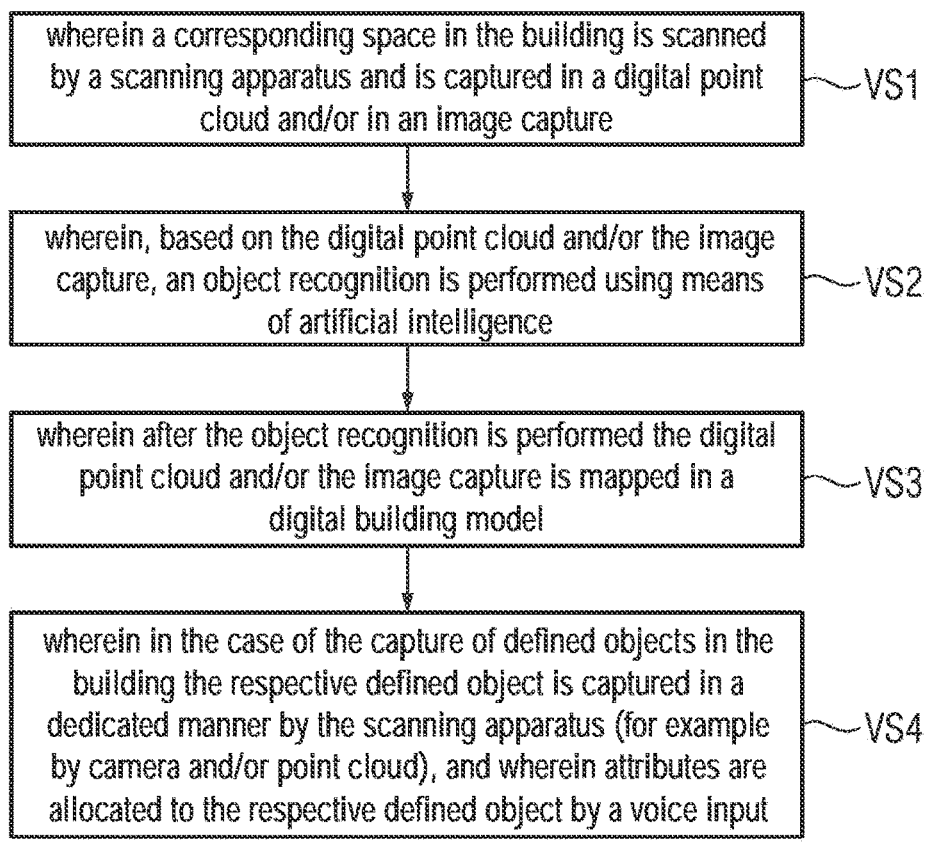
FIG. 4 shows an exemplary flow diagram for a method for the digital capture of spaces of a building incorporating teachings of the present disclosure.

FIG. 4 illustrates an exemplary flow diagram for a method for the digital capture of spaces (for example rooms, hallways) of a building incorporating teachings of the present disclosure. Some embodiments include (VS1) wherein a corresponding space in the building is scanned (and/or measured) by a scanning apparatus (for example NavVis scanner) and is captured in a digital point cloud, (VS2) wherein, based on the digital point cloud, an object recognition is performed (advantageously also an object identification is performed) using means of artificial intelligence, (VS3) wherein after the object recognition is performed the digital point cloud is mapped in a digital building model, (VS4) wherein in the case of the capture of defined objects (for example point of interest, POI, objects of interest) in the building, the respective defined object (for example a fire detector, an actuator, or a sensor) is captured in a dedicated manner by the scanning apparatus (for example by a camera and/or point cloud) and wherein attributes (for example location information, building development information, type information, product information) are allocated to the respective defined object by a voice input of an operator of the scanning apparatus.

Consequently, objects are enriched with additional meta information (for example tags, attributes) by audio input of an operator during the building scan. In some embodiments, the annotation of the image content is performed by the scanning person by suitable voice recognition. In some embodiments, the voice recognition is a trained voice recognition based on mechanisms of machine learning. The dedicated capture of a defined or previously determined object (for example a fire detector, an actuator or a sensor) by the scanning apparatus can be performed for example by a capturing facility that is configured for this purpose (for example by zooming in on the object by a camera that is attached to the scanning apparatus). In some embodiments, the object recognition also comprises an object identification.

A defined object (for example point of interest, POI) is for example an object that is known beforehand in the space. For example, an inventory object that is located in the space (in other words the defined object is an inventory object of the space). In some embodiments, the object that is known beforehand or the inventory object are listed in an inventory catalogue or an inventory plan for the space. The user has access to the inventory catalogue and/or the inventory plan. In some embodiments, the inventory catalogue and/or the inventory plan are displayed on a display of the scanning apparatus.

In some embodiments, a corresponding space in the building is scanned (measured) by the scanning apparatus (for example NavVis scanner) and is captured in a digital point cloud and/or by image recognition (the image recognition can be performed for example by a digital camera) and further processed (for example mapping in the BIM).

In some embodiments, the voice input is performed at the scanning location of the respective defined object in the building. In some embodiments, the voice input is performed at the scanning location of the respective defined object by a user, wherein the respective attributes for a defined object are provided to a user on an output apparatus.

In some embodiments, the respective attributes for a defined object are provided on an output apparatus (for example display) in dependence upon the location of the scanning apparatus. In some embodiments, for the object recognition of defined objects the attributes that are allocated to the respective defined object by the voice input are used.

In some embodiments, for the recognition of the voice input a voice recognition that is not dependent upon the speaker is used. In some embodiments, in the case of the recognition of a nearby defined object, the scanning apparatus outputs a notification (optically and/or acoustically) for the user of the scanning apparatus. The notification is output by corresponding output means on the scanning apparatus, for example loudspeakers, display).

In some embodiments, a method incorporating teachings of the present disclosure for the digital capture of spaces (for example rooms, hallways) of a building can be realized by an accordingly configured scanning apparatus.

If a defined object is recognized in the scan, it can be automatically annotated in the indoor viewer at the recognized position. The position of the object can be referenced in the digital building model (BIM, digital twin). In this regard, the WGS84 position or the room position (distance of wall, ceiling, floor) can be used. The scan in this case provides particularly precise measurement results. The 360° images are namely not merely digital images. The pixels in these images are enriched by laser scans (point cloud), which renders it possible to interact with scanned regions as though one were on site, including more precise point to point measurements.

Point clouds have proven a particularly useful representation of an indoor scene for solving fundamental problems of computer vision. It uses the advantages of the color image that provides information regarding the appearance of an object however also the deep image that is immune to the fluctuations of color, lighting, angle of rotation and scaling. The automatic object recognition is nowadays particularly well-advanced, which promises a reliable use. Since in addition to further information the object recognition also includes the object description, a clear identification and allocation is possible. In the case of a scan, for example using a NavVis M6 trolley, it is thus possible to allocate corresponding voice annotations to each individual object in the scan (for example attributes or meta data with regard to the corresponding object).

Regulations that are stored can in this case increase the quality of the object recognition. In particular, a notification can be output if in accordance with a positioning regulation an object (for example fire detector) should be present however this is not recognized in the scanning region.

In some embodiments, the objects that are clearly identified by the automatic voice recognition are stored as training data in a database that is advantageously successively used by the corresponding deep learning method.

In some embodiments, a method incorporating teachings of the present disclosure offers an efficient capture of data for the provision of so-called "digital twins" (digital building models). Training data for machine learning or deep learning is generated "on the scan job". This means cost saving, quality improvement, furthermore a time/scanning optimization.

Method and arrangement for the digital capture of spaces of a building, wherein a corresponding space in the building is scanned by a scanning apparatus and is captured in a digital point cloud, wherein based on the digital point cloud an object recognition is performed using means of artificial intelligence, wherein after object recognition is performed the digital point cloud is mapped in a digital building model, wherein in the case of the capture of defined objects in the building the respective defined object is captured in a dedicated manner by the scanning apparatus and wherein attributes are allocated to the respective defined object by a voice input and/or a voice message.

LIST OF REFERENCE CHARACTERS

C Cloud
BIM Building model
S Server
R1, R2 Space
KV1-KV3 Communications connection
P1, P2 User
AV1-AV3 Receiving apparatus
PW1-PW3 Point cloud
MG1-MG3 Scanning apparatus
OB1, OB2 Object
IPS Position determining system
SPRE Voice input
A Attribute
SPEV1-SPEV3 Voice recognition apparatus
VVE Pre-processing unit
SPEE Voice recognition unit
D Decoder
AS Analogue voice
RV Reference vectors
AM Acoustic model
WB Dictionary
SM Voice model
WL Word list
VS1-VS4 Method step

What is claimed is:

1. A method for the digital capture of spaces of a building, the method comprising:
   scanning a corresponding space in the building by a scanning apparatus;
   capturing the corresponding space in a digital point cloud and/or by an image capture;
   performing an object recognition, based on the digital point cloud and/or the image capture, using means of artificial intelligence;
   mapping, after the object recognition is performed, the digital point cloud and/or the image capture in a digital building model; and
   in the case of the capture of defined objects in the building, capturing the respective defined object in a dedicated manner by the scanning apparatus;
   wherein attributes are allocated to the respective defined object by a voice input.

2. The method as claimed in claim 1, wherein the voice input is performed at the scanning location of the respective defined object in the building.

3. The method as claimed in claim 1, wherein:
   the voice input is performed at the scanning location of the respective defined object by a user; and
   the respective attributes for a defined object are provided to a user on an output apparatus.

4. The method as claimed in claim 3, further comprising providing the respective attributes for a defined object on the output apparatus in dependence upon the location of the scanning apparatus.

5. The method as claimed in claim 1, further comprising using the attributes that are allocated to the respective defined object by the voice input for the object recognition of defined objects.

6. The method as claimed in claim 1, wherein for the recognition of the voice input a voice recognition that is not dependent upon the speaker is used.

7. The method as claimed in claim 1, wherein in the case of the recognition of a nearby defined object, the scanning apparatus outputs a notification for the user of the scanning apparatus.

8. An arrangement for the digital capture of spaces of a building, the arrangement comprising:
   a scanning apparatus for scanning and/or recording a space in the building, wherein the scanning apparatus is programmed to generate a digital point cloud and/or a digital image capture based on the data that is obtained by the scanning and/or by the recording;

a processing facility programmed to perform an object recognition using means of artificial intelligence based on the digital point cloud and/or the digital image capture, wherein the processing facility is further programmed to map the digital point cloud and/or the image capture in a digital building model;

wherein the scanning apparatus comprises a voice recognition apparatus for capturing voice inputs with regard to defined objects in the space;

wherein attributes are allocated by a voice input to a respective defined object and said attributes are used in the generation of the point cloud and/or the image capture.

9. The arrangement as claimed in claim 8, wherein:

in the case of the capture of defined objects in the building, the respective defined object is captured in a dedicated manner by the scanning apparatus; and attributes can be allocated in a dedicated manner to the respective defined object by a voice input.

10. The arrangement as claimed in claim 8, further comprising a position determining system for recognizing the location of the scanning apparatus in the building;

wherein the respective attributes for a defined object are provided on the output apparatus in dependence upon the location of the scanning apparatus.

11. The arrangement as claimed in claim 8, wherein:

the voice input is performed at the location of the respective defined object by a user;

the respective attributes for a defined object can be provided to the user on an output apparatus.

12. The arrangement as claimed in claim 8, wherein in the case of the recognition of a nearby defined object, the scanning apparatus outputs a notification for the user of the scanning apparatus.

13. The arrangement as claimed in claim 8, wherein the processing facility is integrated into the scanning apparatus.

14. The arrangement as claimed in claim 8, wherein the processing facility is integrated into a cloud infrastructure.

* * * * *